UNITED STATES PATENT OFFICE.

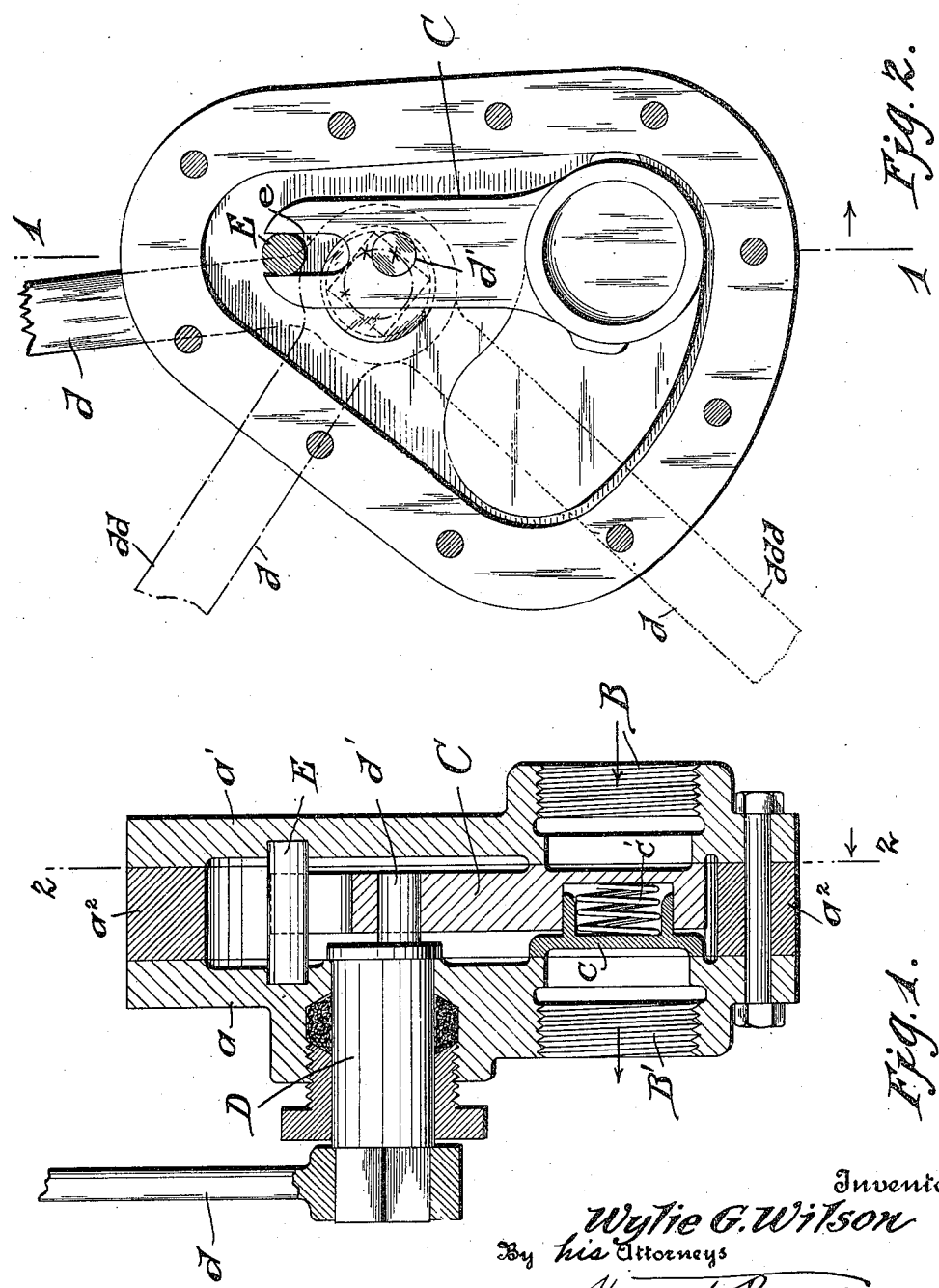

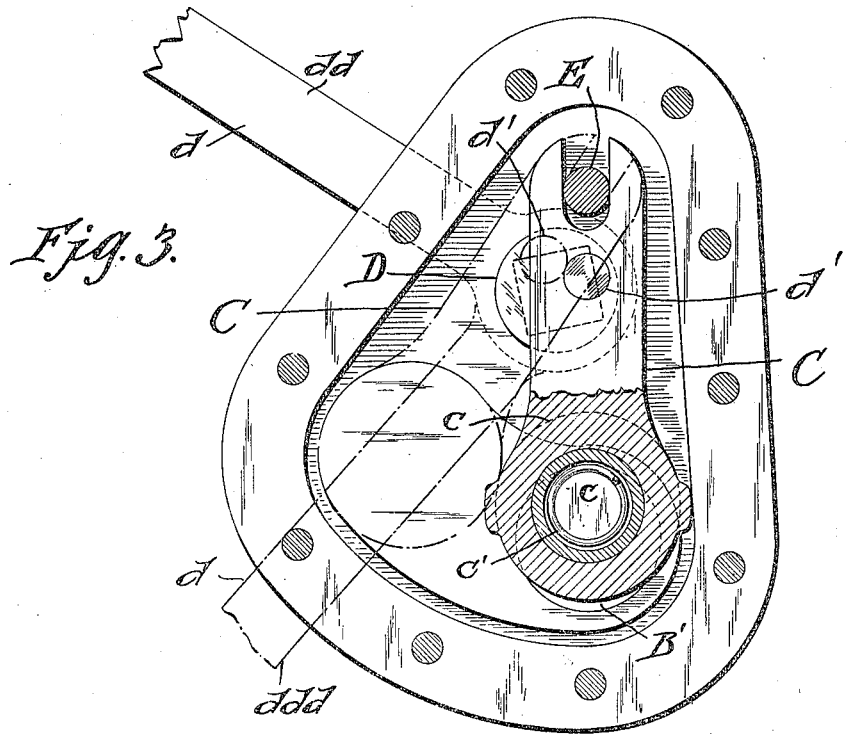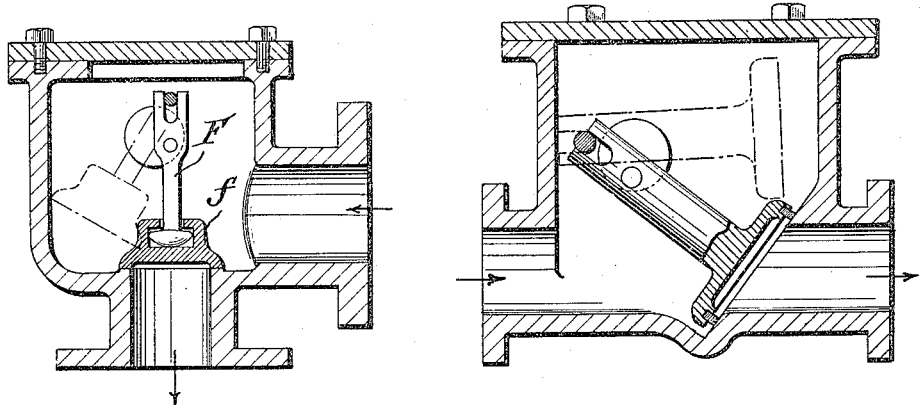

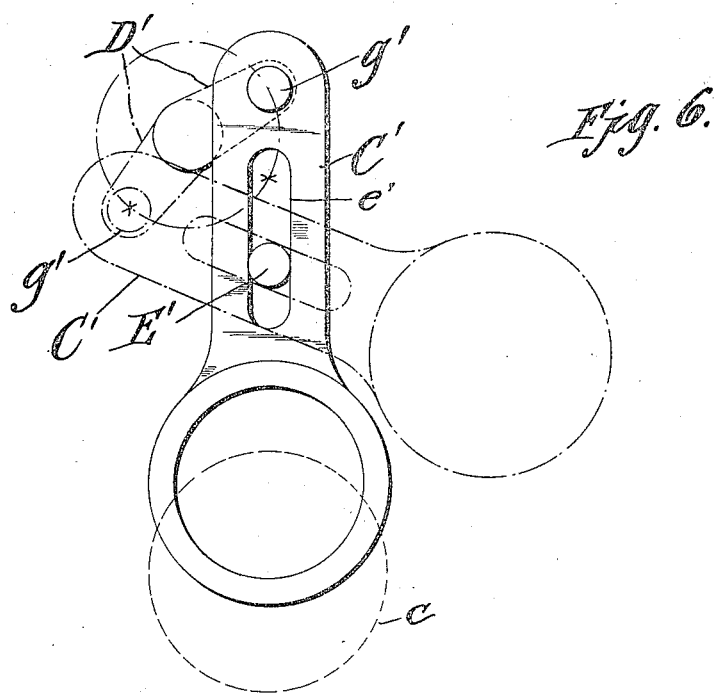
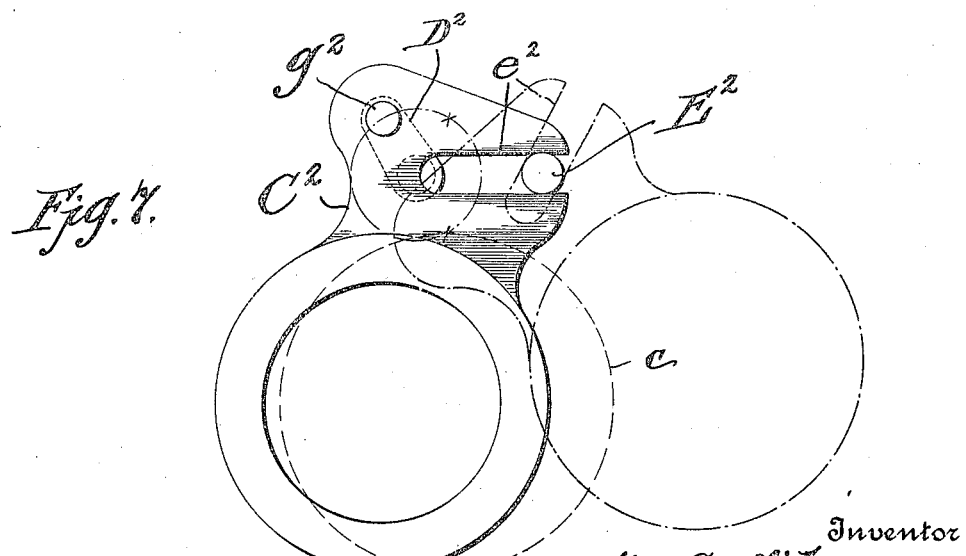

WYLIE GEMMEL WILSON, OF NEW YORK, N. Y.

VALVE.

1,320,433.  Specification of Letters Patent.  Patented Nov. 4, 1919.

Application filed June 25, 1917. Serial No. 176,756.

*To all whom it may concern:*

Be it known that I, WYLIE GEMMEL WILSON, a subject of the King of Great Britain, and resident of New York city, in the county of New York and State of New York, have invented certain new and useful Improvements in Valves, of which the following is a specification.

This invention relates to valves and is directed, more particularly, to valve movements.

It is well recognized that after valves have been left seated for an extended period that a valve is very apt to become stuck to its seat through the action of corrosion, the formation of sediment, or for other well known reasons, which render the operation of unseating the valve, at times, extremely difficult. This is particularly true in the case of large slide valves wherein the sealing disk or disks of the valve are mounted on an operating head which is swung from one end thereof to move the disks into or out of registration with the valve ports. In such valves the operating head forms a long leverage so that, when said head is actuated, quick movement is imparted to the disks whereby the ports may be quickly sealed or unsealed, as the case may be. While this leverage is particularly advantageous in the bringing about of the quick operating of the valve, it is apparent that such leverage is a distinct disadvantage when the disks become stuck, since it is necessary to overcome the sticking action operating through a long leverage, which multiplies the resistance to be overcome in "breaking the bond", *i. e.*, freeing the disks from the grip of corrosion, sediment, etc., and initially moving said disks. While this sticking of the valve is not so important on very small valves, it becomes a problem in the operation of those of the larger type where the operating head may be as long, in some instances, as twenty-four inches. In breaking the bond in a valve of this character a great amount of power is required and it is not infrequent that some part of the valve operating means is broken when sufficient force is supplied to accomplish this result.

In the larger sizes of valves, as well as those of smaller dimensions controlling high pressures, the opening and closing of the valve, at best, requires considerable power due to the weight of the moving parts, and the friction due to pressure. This is for the reason that with a great pressure at one side of the valve and practically none at the other side thereof, the port sealing elements are forced tightly against the valve seats and considerable friction must be overcome before said elements can be moved. When this initial movement is a sliding movement, it will be obvious that great power must be applied in order to open the valve and, if this power is required to work against friction operating through a long leverage, the parts of the valve must necessarily undergo great strains which not infrequently result in breakage.

With the foregoing considerations in mind, the object of the present invention is to provide a valve which will have all the advantages of quick opening under leverage, inherent in slide valves of the type referred to, but, in which said leverage does not come into play during the breaking of the bond occasioned by the initial movement of the valve sealing element or elements.

A further object of the invention is to provide a valve wherein the initial operation of the sealing element or elements is accomplished, by movements of these elements in one direction, to slightly unseal the ports to allow of the partial balancing of the valve, and wherein the subsequent movement of the sealing element or elements to completely open positions is accomplished by movement, in an entirely different direction and under the action of speed increasing leverage, in the absence of friction due to a partially balanced condition of the valve. In other words, I aim in this connection to move the sealing elements in one direction to slightly open the ports and balance the valve, and thereafter avail myself of the quick action of a lever operated sealing element or elements to bring about rapid lateral movement of the sealing element or elements away from the valve seat and out of the path of the flow of fluid which the valve controls.

Features of the invention and advantages thereof, other than those specified, will be apparent from the following detailed description, when read in conjunction with the accompanying drawings.

In the accompanying drawings, I have illustrated different practical embodiments of the present invention, but the constructions therein shown are to be understood as illustrative, only, and not as defining the limits of the invention.

Figure 1 is a transverse section through a valve embodying the present invention, said section being taken substantially in the plane of the line 1—1 of Fig. 2.

Fig. 2 is a face view of a slide valve shown in Fig. 1, one face plate of said valve being removed in the interest of clearness, so that Fig. 2 is, in effect, substantially a section taken in the plane of the line 2—2 of Fig. 1.

Fig. 3 is a view corresponding to that of Fig. 2 illustrating the valve parts in different positions from those shown in Fig. 2.

Figs. 4 and 5 are longitudinal central sections through modified forms of valves embodying the present invention, and Figs. 6 and 7 show, diagrammatically, modified forms of valve actions.

Referring to the drawings, and particularly to Figs. 1, 2 and 3 thereof, a valve of the well known "Everlasting" type is shown. Valves of this general character embody a casing built up with two face plates $a$ $a'$, spaced apart by an annular ring $a^2$ and bolted together to form the casing, as best shown in Fig. 1. In the face plates $a$ and $a'$ are alined inlet and outlet ports B B' with which coöperate one or more sealing disks $c$ mounted for bodily movement on an operating head or stem C. Each sealing disk $c$ is provided with a stem adapted to fit in a pocket in the operating head, a spring $c'$ being positioned intermediate the base of the pocket and the back of the sealing disk to normally cause the disk to tightly seat against the periphery of the port B', as shown in Fig. 1.

The operating head is actuated from an operating post D, movement to which is imparted by a suitable handle or wrench $d$, as is common. But, instead of fixedly mounting the operating head upon a squared or irregularly shaped portion of said post for movement rigidly therewith, as heretofore, the present invention contemplates a distinctively novel connection, next to be described, between these parts. The post D is cylindrical in form and is mounted for rotary movement within the face plate $a$, while the inner end of the post is provided with a smaller cylindrical driving projection $d'$ located off-center of the post D which is journaled for rotation in a cylindrical aperture in the operating head C, as best shown in Figs. 1 and 2. The adjacent end of the operating head is bifurcated or forked by the formation of a slot $e$ therein, and said bifurcated end embraces a guiding pin E, the opposite ends of which are set into the face plates $a$ $a'$, as shown in Fig. 1.

The valve is shown in Figs. 1 and 2 with the operating head in port sealing position and the operation of the handle or wrench $d$ from the full line position in Fig. 2 to the positions through which it is subsequently moved will bring about the following changes in the position of the operating head: If the handle $d$ is moved from the valve closing position shown in full lines in Fig. 2 to the dot and dash lines of said figure designated $dd$, the position of the moving parts of the valve will then be as shown in full lines in Fig. 3. During this interval of movement the driving projection $d'$ will have been shifted in an eccentric path by the post D so as to impart longitudinal movement to the operating head C after the manner in which a pitman follows a wristpin, during which longitudinal movement the disk $c$ will be slid over its seat sufficiently to slightly unseal the port, as shown in Fig. 3. During this operation, the guiding action of the pin E is not availed of, as practically no lateral movement is imparted to the operating head. It is simply slightly lifted to slide the disk $c$ along its seat. However, if the movement of the handle $d$ is continued from the positions $dd$ of Figs. 2 and 3 to the positions $ddd$ of said figures, the continued eccentric movements of the driving projection $d'$ will act upon the operating head, considered as a lever, as the point of applied force, the pin E serving as the fulcrum, while the friction or weight of the sealing disk $d$ at the opposite end of the operating head, constitutes the work.

The driving projection $d'$ is so positioned on the post D that the initial movement of said post, while the handle $d$ is moved to the position $dd$, will be in a direction toward the guiding pin E. However, further rotation of the post will shift the driving projection $d'$ in a generally lateral direction, and this relative movement between the driving projection $d'$ and the guiding pin E will pivotally move the operating head about the guiding pin E, as a center, so that, by the time the handle has assumed the position $ddd$ of Figs. 2 and 3, the operating head will have reached the position shown in dot and dash lines in Fig. 3, at which time the port B will be entirely unsealed.

In moving the operating head into port sealing position, the operations are reversed, the handle moving from the position $ddd$ to the initial position shown in Fig. 2. During the movement of the handle from the position $ddd$ to the position $dd$ the operating head will be moved laterally from the dot and dash line position of Fig. 3 to the full line position thereof, while during the remaining angular movement of said handle to the full line position, said operating head will be longitudinally slid from the full line position of Fig. 3 to the full line position of Fig. 2, at which time the port will be entirely sealed.

The advantages of operating the valve as described are numerous. In the first place it will appear that, at the end of the first opening movement of the valve to the position shown in full lines in Fig. 3, the valve port will be partially unsealed so that the fluid which the valve controls will be free to flow past the sealing disk and through the conduit with which the valve is associated. In this flow of fluid through the conduit there will be the usual skin friction of the fluid with the conduit, and this skin friction will produce a back pressure against the sealing disk which serves, in practice, to partially balance said disk and render its subsequent operations easier, through the obviating of friction between the work and the stationary parts of the valve and the valve casing. Moreover, this initial longitudinal sliding movement of the operating head brings about the breaking of the bond under conditions when the greatest power is applied. This is true because of the eccentric movement of the driving projection $d'$ during such initial movement. Furthermore, the initial movement is comparatively slow but, as soon as the lateral movement of said projection occurs, the movement of the operating head is extremely rapid. Thus, as the handle $d$ is moved from its closed to its entirely open position, the movement is first slow and powerful and thereafter remarkably quick. To state the matter in another way, the valve disk is moved until slightly open, as though it were hung direct from a short crank, and, after being moved to this slightly open position, it is then quickly oscillated to the full open position through mechanism simulating second class lever principles, this method of operating valves is much more positive, rapid and powerful than the method heretofore employed of securing the operating head directly to the valve post and oscillating said head bodily coaxially of the post through a rigid connection therewith. The quick moving leverage principles by which the lateral movement of the sealing disk is accomplished is practically absent during that operation of the disk for breaking the bond and partially balancing the valve, and said leverage action preferably only comes into play after the bond has been broken and the valve is partially balanced so that the valve of this invention operates with greater ease and is less liable to breakage than slide valves as heretofore employed. In a valve embodying this invention, the operator is enabled to break the bond through the application of great power operating at comparatively slow speed and then shift the valve laterally away from its seat with great rapidity, during which operations the handle $d$ is moved at a constant speed.

In the form of the invention described, the guiding pin E is shown as rigidly mounted in the valve casing and coöperates with the slot $e$ formed in one end of the operating head. This is a convenient method of manufacturing, though, if desired, the same result may be accomplished by forming a pin, corresponding to the guiding pin E, directly upon the operating head and having the same work in a slot or slots formed in the inner face of one or both of the face plates. Moreover, while I have chosen to show the slide valve in Figs. 1 and 2 as of the single sealing disk type it will, of course, be manifest that the present invention is equally applicable to the well known double disk type of slide valve, wherein a sealing disk is associated with both of the opposite faces of the operating head thereby serving to simultaneously seal or unseal both the inlet and outlet ports.

In Figs. 4 and 5 there is illustrated the manner in which the present invention may be applied to different well known forms of lift valves. In Fig. 4 a right angle directional valve is shown, the sealing disk $f$, corresponding to the hereinbefore mentioned sealing disk $c$, is mounted on an operating head or stem F, corresponding to the operating head C. The method of actuating the sealing disk and operating head is substantially the same, in the construction of Fig. 4, as in the constructions of Figs. 1–3 inclusive except that, during the initial movement of the disk $f$, said disk is lifted directly off of its seat instead of given a sliding movement as was the case with the disk $c$. However, after the disk is lifted from its seat to partially unseal the valve, lateral movement is transmitted thereto as in the case of disk $c$, through the actuation of a suitable operating handle (not shown).

In Fig. 5 a straight-through lift valve is illustrated, the operations of which are carried out in the same manner as described with relation to Fig. 4. A great advantage in the application of this invention to valves of the type shown in Figs. 4 and 5, in addition to those hereinbefore specified, is due to the fact that the operator is given a great purchase on the sealing disk at the moment of opening and is enabled to press said disk very hard to its seat at the moment of closing, due particularly to the eccentric action of the driving projection of the valve operating post.

It will be understood that in carrying out this invention the eccentrically moving arm need not, necessarily, coöperate with the valve stem intermediate its ends, and said stem be guided at one end as hereinbefore described, since, if desired, the eccentrically moving operating pin may coöperate with one free end of the valve stem while said stem is guided intermediate its ends. Such a construction is shown in Fig. 6 of the drawings wherein the valve stem C' is shown as provided with a longitudinal slot e' in which operates a guide pin E' rigidly mounted within the casing. If desired, the pin E' may be fixed on the valve stem e' as a trunnion and a slot, similar to the slot e', to be formed within the valve casing. The operation of a valve organized as specified may be carried out through the manipulation of a valve post similar to that designated D in Figs. 1 and 2 of the drawings, or may, if desired, be operated through the medium of a crank D' carrying on its free end a crank pin g' corresponding to the operating projection d'. The closed position of the valve is shown in full lines in Fig. 6, while the fullest open position of the valve is designated by the dot-and-dash lines, the dash lines denoting the position of the sealing disk c at the termination of the power stroke employed for breaking the bond and prior to the swinging of the valve into fully open position.

In Fig. 7 the valve stem is shown in the form of a plate C² provided with a guiding slot e² adapted to engage with the guide pin E², said valve stem being operated through the medium of a crank G² carrying a crank pin g². The full lines designate the positions of the parts when the valve is closed. The dot-and-dash lines designate the positions of the parts when the valve is fully opened, and the dash lines the position of the sealing disk c at the end of the bond breaking operation and before the valve has been swung to fully open position.

From what has been said it appears that the structure is susceptible to various modifications without departing from the spirit of the invention. The operating projection may be in the form of a crank or simply a pin for projecting eccentrically from the end of the valve post. This pin may coöperate either with the end of the valve stem and said stem be guided intermediate its ends or it may coöperate with the valve stem intermediate its ends and the stem be guided from one end thereof. Thus, we find in Figs. 6 and 7 the eccentric operation coöperating with the end of the stem while, in the remaining figures the eccentric operation coöperates intermediate the ends of the stem. Other modifications in construction may be made without departing from the spirit of the invention, and the showings made are to be understood as illustrative, only, and not as defining the limits of the invention.

The manner of manipulating a valve as hereinbefore described constitutes a method, independently of any specific mechanism, and I propose to file a separate application thereon.

Having thus fully described the invention what I claim as new and desire to secure by Letters Patent, is:

1. A valve action embodying a valve casing, a valve therein provided with a stem, a seat for said valve, means for actuating the valve, and means for precluding unrestricted movement of the free end of the valve stem, in combination with connections between the valve actuating means and the valve stem and coöperating with the latter intermediate its ends, said connections being adapted, when the valve actuating means is operated, to shift the valve stem longitudinally for a predetermined extent and thereafter oscillate said valve stem laterally.

2. A valve action embodying a valve casing, a valve therein provided with a stem, a seat for said valve, means for actuating the valve, and means for precluding unrestricted movement of the free end of the valve stem, in combination with connections between the valve actuating means and the valve steam and coöperating with the latter intermediate its ends, said connections being adapted, when the valve actuating means is operated, to shift the valve stem longitudinally for a predetermined extent and thereafter oscillate said valve stem laterally, the means for precluding unrestricted movement of the end of the valve stem serving as a fulcrum during such oscillatory movement of the stem.

3. A valve action embodying a valve casing, a valve therein provided with a stem, a seat for said valve, means for actuating the valve, and means for precluding unrestricted movement of the free end of the valve stem, in combination with eccentrically operating connections between the valve actuating means and the valve stem and coöperating with the latter intermediate its ends, said connections being adapted, when the valve actuating means is operated, to shift the valve stem longitudinally for a predetermined extent, for the purpose of partially opening the valve, and thereafter oscillate said valve stem for the purpose of shifting the valve to fully open position.

4. A valve action embodying a valve casing, a valve therein provided with a stem, a seat for said valve, a guide for the free end of the valve stem, adapted to preclude unrestricted movement of said end, and an actuating member for said valve, in combination with eccentric connections between the actuating member and the valve stem and coöperating with said valve stem intermediate the ends thereof, said eccentric connections being adapted, when the actuating member is operated, to impart longitudinal movement to the valve stem to a predetermined extent for partially opening the valve, and thereafter oscillate said valve stem about the guide, as a center, for the purpose of shifting the valve to fully open position.

5. A valve casing, a valve provided with a stem therein, means associated with the free end of the stem for restricting the operations of said stem to those of sliding and pivotal movement, in combination with means for successively imparting such sliding and pivotal movement to said stem.

6. A valve action embodying a valve casing, a slide valve therein, and a seat therefor, in combination with valve actuating means embodying mechanism for shifting the valve, in one direction, relative to its seat, into partially open position while the valve is maintained in engagement with its seat, and subsequently moving said valve, in a different direction, into fully open position.

7. A valve action embodying a valve casing, a slide valve therein, and a seat therefor, in combination with valve actuating means embodying mechanism for successively shifting the valve in different directions with substantially constantly increasing speed during the opening of the valve, and substantially constantly decreasing speed during the closing thereof.

8. A valve action embodying a valve casing, a valve therein, and a seat therefor, in combination with valve actuating means embodying means for partially opening the valve by movement of said valve on its seat, in one direction, to bring the valve into partially balanced condition while the valve is maintained in engagement with its seat, and immediately thereafter moving the valve in a different direction to fully open position.

9. A valve action embodying a valve casing, a slide valve therein, and a seat therefor, in combination with valve actuating means embodying means for partially opening the valve by movement of said valve on its seat, in one direction, to bring the valve into partially balanced condition while the valve is maintained in engagement with its seat, and immediately thereafter moving the valve in a different direction, and at increased speed, to fully open position.

10. A valve action embodying a valve casing, a slide valve therein and a seat therefor in combination with eccentrically operated means for actuating the valve whereby initial movement of the said operating means partially opens the valve by a movement thereof in one direction while subsequent movement of the said means operates to move the valve in a different direction to a position where the valve is fully opened.

11. A valve action embodying a valve casing, a port therein, and slide valve sealing means associated with said port, in combination with means for slightly unsealing said port by movement of the sealing means in one direction while the sealing means is maintained in engagement with its seat, and thereafter completely unsealing said port by further movement of the sealing means in a different direction.

12. A valve action embodying a slide valve, a valve seat, means for partially opening the valve by moving it in one direction while the slide valve is maintained in engagement with its seat, and means for completing the opening of said valve by moving it in another direction.

13. In a valve action, a slide valve, a valve seat, means for applying a comparatively great force in starting the opening of the valve in one direction while the slide valve is maintained in engagement with its seat, whereby abnormal sticking between the valve and its seat is first overcome, and means for thereafter continuing the opening of the valve by moving it in a different direction with greater speed but less power than before.

14. A valve action embodying a slide valve, a seat therefor, and means for operating the valve, in combination with connections, intermediate the valve and its operating means, adapted to translate a given amount of energy transmitted to the operating means into movement of the valve, to partially open position, under great power and low speed while the slide valve is maintained in engagement with its seat, and to thereafter translate the same given amount of energy in the operating means to movement of the valve, to fully open position, at a lesser power and greater speed than before.

15. A valve action embodying a slide valve, a seat therefor, and means for partially opening the valve through the application of high power, operating at low speed while the slide valve is maintained in engagement with its seat, and thereafter continuing the opening of the valve by the application of less power operating at a greater speed than before.

16. A valve action embodying a valve, means for directly effecting movement of the valve for a predetermined extent, and means for effecting further movement of the valve through the employment of a fulcrum.

17. A valve action embodying a valve, a stem therefor, means for directly effecting the opening of the valve to a predetermined extent, and means for anchoring a portion of the valve stem while the valve operating means continues to operate, whereby the valve stem serves as a lever oscillating about a fulcrum to accelerate the opening of the valve.

18. A valve action embodying a valve, means for partially opening the valve by bodily moving it in one direction, and means for continuing the movement of the valve in another and different direction to completely open position by the oscillation of said valve.

19. A valve action embodying a valve casing, a valve therein provided with a stem, a seat for said valve, means for actuating the valve, and means for precluding unrestricted movement of a portion of the stem, in combination with connections between the valve actuating means and the valve stem, said connections being adapted, when the valve actuating means is operated, to shift the valve stem longitudinally for a predetermined extent and thereafter oscillate said valve stem laterally.

20. A valve action embodying a valve casing, a valve therein provided with a stem, a seat for the valve, means for actuating the valve, and means coöperating with the valve stem intermediate its ends for precluding unrestricted movement to the stem intermediate its ends, in combination with connections between the valve actuating means and the valve stem and coöperating with the latter adjacent its free ends, said connections between the valve actuating actuating means is actuated, to shift the valve stem longitudinally for a predetermined extent and thereafter oscillate said valve stem laterally.

Signed by me at New York city, N. Y., this 6th day of June, 1917.

WYLIE GEMMEL WILSON.

Witnesses:
ANNA F. DAVIDSON,
MARGARET VOGEL.

Copies of this patent may be obtained for five cents each, by addressing the "Commissioner of Patents, Washington, D. C."

It is hereby certified that in Letters Patent No. 1,320,433, granted November 4, 1919, upon the application of Wylie Gemmel Wilson, of New York, N. Y., for an improvement in "Valves," errors appear in the printed specification requiring correction as follows: Page 6, line 27, claim 20, for the word "ends" read *end;* line 28, for the word "between" read *being adapted, when;* and same line strike out the word "actuating"; that the claim may read as follows:

*20. A valve action embodying a valve casing, a valve therein provided with a stem, a seat for the valve, means for actuating the valve, and means coöperating with the valve stem intermediate its ends for precluding unrestricted movement to the stem intermediate its ends, in combination with connections between the valve actuating means and the valve stem and coöperating with the latter adjacent its free end, said connections being adapted, when the valve actuating means is actuated, to shift the valve stem longitudinally for a predetermined extent and thereafter oscillate said valve stem laterally;* and that the said Letters Patent should be read with these corrections therein that the same may conform to the record of the case in the Patent Office.

Signed and sealed this 6th day of January, A. D., 1920.

[SEAL.]

M. H. COULSTON,

*Acting Commissioner of Patents.*

Cl. 277—60.